Dec. 25, 1934.   C. E. SWENSON   1,985,669
UNIVERSAL JOINT
Original Filed June 6, 1932
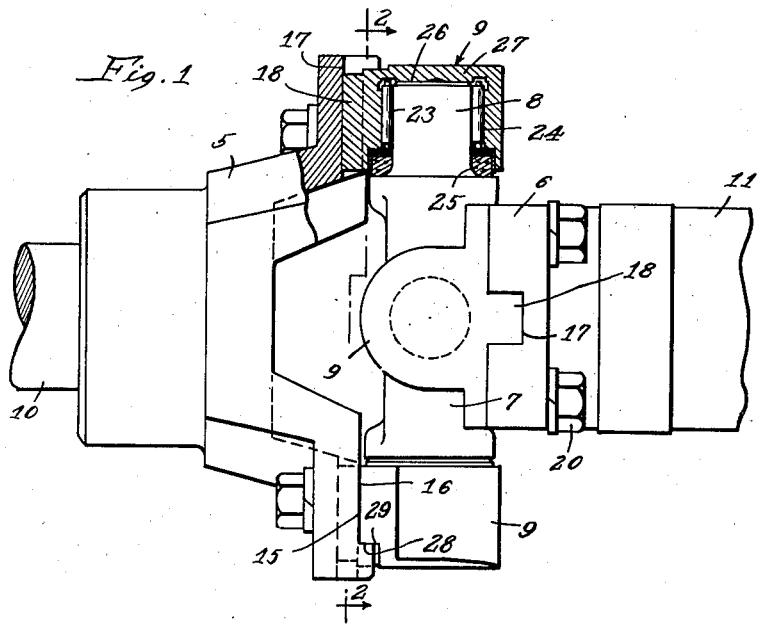
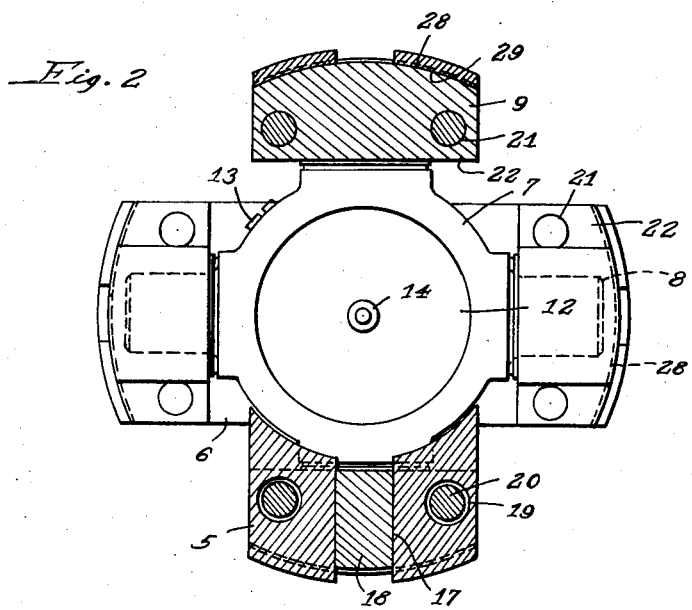
Inventor:
Carl E. Swenson Patented Dec. 25, 1934

1,985,669

UNITED STATES PATENT OFFICE 1,985,669

UNIVERSAL JOINT

Carl E. Swenson, Rockford, Ill.

Original application June 6, 1932, Serial No. 615,496. Divided and this application January 12, 1933, Serial No. 651,265

16 Claims. (Cl. 64—102)

This invention relates to an improved trunnion type universal joint.

The principal object of my invention is to provide a universal joint having bearing blocks arranged to be fastened to the yoke members and to fit on the trunnions of an intermediate spider member, the yokes having arcuate pilot shoulders machined thereon at a predetermined radius for abutment by arcuate surfaces accurately ground on the ends of the blocks in a predetermined relation to accurately machined flat end thrust bearing surfaces provided in said blocks, so that when the arcuate surfaces on the blocks are in abutment with the aforesaid arcuate pilot shoulders on the yokes, the proper small number of thousandths of an inch clearance is provided between the accurately ground flat ends of the trunnions and the end thrust bearing surfaces. The abutment of the blocks with the machined shoulders on the yoke members not only accurately locates the block for trunnion end clearance, as just stated, but relieves the block fastening means of the load incident to the end thrust.

The invention is illustrated in the accompanying drawing, in which—

Figure 1 is a side view of a universal joint made in accordance with my invention showing one of the bearings in longitudinal section, and Fig. 2 is a transverse section on the broken line 2—2 of Figure 1.

This application is a division of my copending application Serial No. 615,496, filed June 6, 1932.

The universal joint illustrated, briefly stated, consists of a pair of yokes or terminal coupling members 5 and 6 connected by means of an intermediate transmission member 7, often referred to as the spider, the same providing four trunnions 8, 90° apart. The trunnions are received in cup-shaped bearing blocks 9, each yoke being equipped with one pair of these bearings in diametrically opposed relation. The yokes 5 and 6 are suitably connected to driving and driven members, the yoke 5 in this instance turning with a shaft 10, and the yoke 6 with a shaft 11. The spider 7 is usually made hollow so as to provide a central lubricant reservoir, the opposite sides of which are closed by plates 12 welded or otherwise suitably secured in place. Radial holes are provided in the trunnions 8 communicating with the reservoir to conduct lubricant therefrom to the bearing blocks 9. The reservoir is filled by removal of a plug 13 from an opening in the spider, air being bled from the reservoir from a suitable check valve 14, so as to allow the injection of a predetermined amount of lubricant. While, of course, any fluid or semi-fluid lubricant might be used, I have found what is commonly called cup grease satisfactory and fill the joint completely, the escape of grease from the valve 14 being relied upon to show when the joint is filled.

The yokes 5 and 6 are preferably machine finished on all surfaces so as to have a true dynamic balance. The surfaces 15, therefore, provide smooth seats for abutment by flat faces 16 provided on the backs of the blocks 9. The yokes are milled to provide radial slots 17 for reception of radial lugs 18 on the blocks 9, and are bored as at 19 on opposite sides of the slots 17 to receive bolts 20 which thread in holes 21 in lugs 22 formed on the bearing blocks, whereby to clamp the latter to the yokes. The holes 19 are purposely made slightly larger than the diameter of the bolts 20 for a purpose which will appear later. The holes 19, in other words, are not intended to affect the location of the bearing blocks but simply accommodate the bolts for clamping the blocks to the yokes, the location of the blocks being accurately determined in another way in accordance with the present invention, as will soon appear. It is apparent from the construction thus far described that good torque transmitting connections are provided between the bearing blocks and the respective yokes, and the bolts 20 are relieved of any part of that load.

The bearing blocks 9 may be constructed to provide any suitable or preferred type of bearings, so far as the present invention is concerned. Thus I have shown anti-friction rollers 23 which make for easier and smoother operation than plain journal bearings, and, consequently, more efficient power transmission and longer life. These rollers run on the side of the trunnions 8 on the one hand, and on the other hand, have bearing contact with the side wall 24 of the cylindrical bearing recess provided in the blocks. The rollers are suitably retained in the blocks so that each block with its complement of rollers is a unit which may be removed and replaced with facility, for inspection, repair or replacement. Suitable packing means is provided on each bearing to seal the same against loss of lubricant or entry of dirt and water. Each bearing, in addition to providing lateral bearing support for its trunnion, has an accurately machined flat bearing surface 26 provided on the inside of the end wall 27 thereof to assume end thrust.

In accordance with my invention, I provide arcuate pilot shoulders 28 on the yokes 5 and 6 for engagement with companion arcuate surfaces 29 on the bearing blocks 9. The surfaces 23 are properly related to the end thrust bearing surfaces 26 so that the ends of the trunnions will have a predetermined clearance with respect to the surfaces 26 when the blocks are mounted on the yokes with the surfaces 29 in engagement with the shoulders 28, that is, enough clearance to prevent binding and allow free movement of the parts, but not enough to interfere with smooth and quiet operation. This arrangement manifestly also relieves the block fastening means 20 of the load incident to end thrust. The bolts 20, in other words, simply clamp the blocks 9 to the yokes. The reason for making the bolt holes 19 in the yokes larger than the diameter of the bolts 20 must now be apparent; it allows the bearing blocks to be shifted slightly with respect to the yokes before tightening the bolts to bring the surfaces 29 into tight engagement with the shoulders 28, whereupon the tightening of the bolts completes the assembling with the bearing blocks solidly and accurately mounted on the yokes.

It is believed the foregoing description conveys a good understanding of all of the objects and advantages of my invention. The appended claims are drawn so as to cover all legitimate modifications and adaptations.

I claim:

1. In a universal joint assembly, a pair of yoke members, an intermediate trunnion member having the ends of the trunnions thereof formed to provide end thrust bearing surfaces, bearings for the trunnions of the last mentioned member comprising cup-shaped blocks arranged to be fastened to said yoke members, the yoke members each having a diametrical slot provided thereon, radial lugs provided on the blocks and fitting in the slots, each interfitting slot and lug providing a torque transmitting connection whereby to relieve the bearing fastenings of the load incident to transmission of torque through the intermediate member from the one yoke to the other, each bearing block having an end thrust bearing surface provided on the inside of the end wall thereof for abutment with the end of the trunnion received in the block, the lugs being shiftable radially in the slots to bring the end thrust bearing surfaces in a predetermined spaced relation to the ends of said trunnions, abutting arcuate thrust transmitting surfaces on the blocks and yoke members struck on arcs with their centers coinciding with the radial lugs, for positively limiting outward radial movement of the blocks relative to the yoke members whereby to provide a predetermined clearance at the end thrust bearing surfaces, and means for fastening said blocks in their operative positions to said yoke members.

2. In a universal joint assembly, a pair of yoke members, an intermediate trunnion member having the ends of the trunnions thereof formed to provide end thrust bearing surfaces, bearings for the trunnions of the last mentioned member comprising cup-shaped blocks arranged to be fastened to said yoke members, the yoke members each having a diametrical slot provided thereon, radial lugs provided on the blocks and fitting in the slots, each interfitting slot and lug providing a torque transmitting conection whereby to relieve the bearing fastenings of the load incident to transmission of torque through the intermediate member from the one yoke to the other, said bearing blocks each having an end thrust bearing surface provided on the inside of the end wall thereof for abutment with the end of the trunnion received in the block, a pair of arcuate projections on each of said yoke members in diametrically opposed relation and struck on arcs of substantially the same radius with the axis of the yoke member as a center, said arcuate projections being arranged to engage correlated arcuate surfaces provided on the blocks whereby to accurately locate the blocks on the yoke members with proper clearance at the ends of the trunnions, and, in addition, assume end thrust between the trunnions and the yoke members and relieve the bearing fastenings of that load, and means for fastening said blocks to said yoke members.

3. In a universal joint assembly, a pair of yoke members, an intermediate trunnion member having the ends of the trunnions thereof formed to provide end thrust bearing surfaces, bearings for the trunnions of the last mentioned member comprising cup-shaped blocks arranged to be fastened to said yoke members, said blocks each having an end thrust bearing surface provided on the inside of the end wall thereof for abutment with the end of the trunnion received in the block, a pair of arcuate projections on each of said yoke members in diametrically opposed relation and struck on arcs of substantially the same radius with the axis of the yoke member as a center, said arcuate projections being arranged to engage correlated arcuate surfaces provided on the outer ends of said blocks, whereby to accurately locate the blocks on the yoke members with the proper clearance at the ends of the trunnions, and in addition, assume end thrust between the trunnions and the yoke members and relieve the bearing fastenings of that load, and means for fastening said blocks to said yoke members.

4. In a universal joint assembly, a pair of yoke members, and an intermediate trunnion member disposed between the yoke members and comprising trunnions arranged to be pivotally connected to the yoke members by means of trunnion bearings mounted on the yoke members, the trunnion bearings comprising separate blocks arranged to be detachably secured to the yoke members, said blocks being constructed to provide radial bearing for the trunnions and having end thrust bearing surfaces provided on the inside of the end walls thereof for end thrust bearing engagement with the ends of said trunnions, said blocks having arcuate surfaces formed on the outside thereof finished to a certain radial dimension with respect to said end thrust surfaces, and said yoke members each having a pair of concentric diametrically opposed arcuate shoulders provided thereon struck on arcs with the axis of rotation as a center for engagement with the arcuate surfaces on said blocks, each pair of said arcuate shoulders being finished to a certain diametrical dimension with reference to the radial dimension, and the opposed trunnions on the intermediate member having the end surfaces thereof finished to another dimension with relation to the diametrical dimension, whereby when the bearing blocks are fitted on the trunnions and fastened to the yoke members with the arcuate surfaces on said blocks engaging the arcuate shoulders on said yoke members, the ends of said trunnions are in a predetermined spaced relation to the end thrust bearing surfaces in said blocks.

5. In a pivotal joint, the combination of a rotary yoke having a flat face provided thereon in a plane normal to the axis of rotation, a bearing block having a flat surface for abutment with the yoke face, a projecting shoulder on said yoke, for abutment with the outer end of the bearing block having the abutting inner surface thereof struck on an arc with the axis of rotation as a center, the end of said block having a complementary arcuate surface of approximately the same radius and center for abutment therewith, and means for securing said block to the face of said yoke.

6. In a pivotal joint, the combination of a rotary yoke having a flat face provided thereon in a plane normal to the axis of rotation, a bearing block having a flat surface for abutment with the yoke face, one of said block and yoke members having a recess provided therein and the other of said members having a projection for entry in said recess when the block is in engagement with the face of said yoke, a projecting shoulder on said yoke for abutment with the outer end of the bearing block having the abutting inner surface thereof struck on an arc with the axis of rotation as a center, the end of said block having a complementary arcuate surface of approximately the same radius and center for abutment therewith, and means for securing said block to the face of said yoke.

7. In a pivotal joint, the combination of a rotary yoke having a flat face provided thereon in a plane normal to the axis of rotation, a bearing block having a flat surface for abutment with the yoke face, said yoke member having a keyway provided therein extending radially relative to the axis of rotation, said bearing block having a complementary key projection also extending radially with respect to the axis of rotation for entry in the keyway, a projecting shoulder on said yoke for abutment with the outer end of the bearing block having the abutting inner surface thereof struck on an arc with the axis of rotation as a center, the end of said block having a complementary arcuate surface of approximately the same radius and center for abutment therewith, and means for securing said block to the face of said yoke.

8. In a universal joint having two yoke members and an intermediate trunnion member, a flat bearing support on each of said yoke members in a plane normal to the axis of rotation, trunnion bearing blocks on each of said yoke members having flat surfaces for abutment with the bearing support, projecting shoulders on said bearing support for abutment with the outer ends of the bearing blocks having the abutting inner surfaces thereof struck on an arc with the axis of rotation as a center, the ends of said blocks having complementary arcuate surfaces of approximately the same radius and center for abutment therewith, and means for securing said blocks to said bearing support.

9. In a universal joint having two yoke members and an intermediate trunnion member, a flat bearing support on each of said yoke members in a plane normal to the axis of rotation, trunnion bearing blocks on each of said yoke members having flat surfaces for abutment with the bearing support, the bearing support having a recess adjacent each of said bearing blocks for reception of a projection on said block when the block is in engagement with the flat surface of the bearing support, projecting shoulders on said bearing support for abutment with the outer ends of the bearing blocks having the abutting inner surfaces thereof struck on an arc with the axis of rotation as a center, the ends of said blocks having complementary arcuate surfaces of approximately the same radius and center for abutment therewith, and means for securing said blocks to said bearing support.

10. In a universal joint having two yoke members and an intermediate trunnion member, a flat bearing support on each of said yoke members in a plane normal to the axis of rotation, trunnion bearing blocks on each of said yoke members having flat surfaces for abutment with the bearing support, the bearing support having a slot provided therein adjacent each of the bearing blocks extending substantially radially with respect to the axis of rotation, each of said blocks having a complementary projection extending substantially radially with respect to the axis of rotation for entry in the slot, projecting shoulders on said bearing support for abutment with the outer ends of the bearing blocks having the abutting inner surfaces thereof struck on an arc with the axis of rotation as a center, the ends of said blocks having complementary arcuate surfaces of approximately the same radius and center for abutment therewith, and means for securing said blocks to said bearing support.

11. In a pivotal joint, the combination of a rotary yoke having a flat face provided thereon in a plane normal to the axis of rotation, a bearing block having a flat surface for abutment with the yoke face, a projecting shoulder on said yoke having an arcuate surface struck on an arc with the axis of rotation as a center, the block having a complementary arcuate surface of approximately the same radius and center for abutment therewith, and means for securing said block to the face of said yoke.

12. In a pivotal joint, the combination of a rotary yoke having a flat face provided thereon in a plane normal to the axis of rotation, a bearing block having a flat surface for abutment with the yoke face, said yoke member having a recess provided therein extending radially relative to the axis of rotation receiving a portion of said bearing block to locate the block radially with respect to the axis of rotation, a projecting shoulder on said yoke having an arcuate surface struck on an arc whose center is in alignment with the axis of the radial recess, the block having a complementary arcuate surface of approximately the same radius and center for abutment therewith, and means for securing said block to the face of said yoke.

13. In a universal joint having two yoke members and an intermediate trunnion member, a flat bearing support on each of said yoke members in a plane normal to the axis of rotation, trunnion bearing blocks on each of said yoke members having flat surfaces for abutment with the bearing support, projecting shoulders on said bearing support having arcuate surfaces struck on an arc with the axis of rotation as a center, said surfaces being in abutment with arcuate surfaces of the same radius and center provided on said blocks, and means for securing said blocks to said bearing support.

14. In a universal joint having two yoke members and an intermediate trunnion member, a flat bearing support on each of said yoke members in a plane normal to the axis of rotation, trunnion bearing blocks on each of said yoke members having flat surfaces for abutment with the bearing support, the yoke having a recess therein extending substantially radially with respect to the axis of rotation, each of said blocks having a portion received in the recess for location of the block radially with respect to the axis of rotation, projecting shoulders on said bearing support having arcuate surfaces each struck on an arc whose center is in alignment with the axis of the radial recess, said surfaces being in abutment with arcuate surfaces of the same radius and center provided on said blocks, and means for securing said blocks to said bearing support.

15. In a universal joint, the combination of a yoke member provided with a bearing seat having a keyway extending substantially radially therein from the outer end thereof, a bearing block having a key projection entered in said keyway, the yoke member having an arcuate shoulder projecting from the bearing seat at the outer end thereof extending in opposite directions from the keyway, the outer end of said bearing block having an arcuate shoulder conformed to fit the aforesaid shoulder, and means for securing said block to said seat with the shoulders in engagement and the key entered in the keyway.

16. In a universal or pivotal joint, the combination of a yoke member provided with a bearing seat having a keyway extending substantially radially therein from the outer end thereof, an arcuate shoulder on the yoke member projecting from the seat at the outer end of the keyway, a trunnion member adapted to be pivotally connected with the yoke member, a cup-shaped bearing block fitting on a trunnion on said trunnion member with its end wall arranged for abutment with the end of the trunnion, the bearing block having a key projection for entry in the keyway and having an arcuate shoulder on the outer end thereof conformed to fit the aforesaid arcuate shoulder, and means for securing said block to said seat with the key entered in the keyway, the arcuate shoulders in engagement, and the end wall arranged for abutment with the end of the trunnion.

CARL E. SWENSON.